United States Patent
Xu et al.

(10) Patent No.: US 12,186,847 B2
(45) Date of Patent: Jan. 7, 2025

(54) SELECTIVE FIELD-ASSISTED MACHINING SYSTEM

(71) Applicant: HUAZHONG UNIVERSITY OF SCIENCE AND TECHNOLOGY, Hubei (CN)

(72) Inventors: Jianfeng Xu, Hubei (CN); Zhengding Zheng, Hubei (CN); Jianguo Zhang, Hubei (CN); Kai Huang, Hubei (CN); Mao Wang, Hubei (CN); Xiao Chen, Hubei (CN); Junfeng Xiao, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/395,622

(22) Filed: Dec. 25, 2023

(65) Prior Publication Data

US 2024/0131644 A1 Apr. 25, 2024
US 2024/0227097 A9 Jul. 11, 2024

Related U.S. Application Data

(63) Continuation of application No. PCT/CN2022/119848, filed on Sep. 20, 2022.

(30) Foreign Application Priority Data

Oct. 15, 2021 (CN) .......................... 202111205023.2

(51) Int. Cl.
*B23P 25/00* (2006.01)
*B23K 26/00* (2014.01)
*B23P 23/00* (2006.01)

(52) U.S. Cl.
CPC ........ *B23P 25/006* (2013.01); *B23K 26/0093* (2013.01); *B23P 23/00* (2013.01)

(58) Field of Classification Search
CPC .... B23P 23/00; B23P 25/006; B23K 26/0093; Y10T 82/10–30; Y10T 408/10–99; Y10T 409/10–50984
See application file for complete search history.

(56) References Cited

U.S. PATENT DOCUMENTS 4,646,595 A * 3/1987 Slee ...................... B23B 29/125
                                                                82/904
6,980,571 B1   12/2005 Press et al.
(Continued)

FOREIGN PATENT DOCUMENTS

CN   105710980        6/2016
CN   106216745 A  * 12/2016  ............... B23C 3/00
(Continued)

OTHER PUBLICATIONS

EPO Machine Translation of CN111069767A—Xu et al.; "Ultrasonic vibration micro laser assisted composite single-point diamond cutting processing system"; Apr. 28, 2020.*
(Continued)

*Primary Examiner* — Erica E Cadugan
*Assistant Examiner* — Michael Vitale
(74) *Attorney, Agent, or Firm* — JCIPRNET (57) ABSTRACT

Disclosed is a selective field-assisted machining system. The system includes a micron-level high-speed identification module, an in-situ laser assisted module, an ultrasonic vibration module, an energy field loading high-speed control module, and a diamond tool. The micron-level high-speed identification module is used to quickly identify the type of a material substrate of a workpiece to be processed, process the identification information into a corresponding control signal, and send same to the energy field loading high-speed control module to implement selective processing of the workpiece to be processed, i.e. to process brittle particles using in-situ laser assisted machining and to process a soft
(Continued)

metal substrate using ultrasonic vibration processing. In the present invention, ultra-precision cutting of brittle particles and a soft metal substrate can be completed at the same time in a single processing process.

9 Claims, 4 Drawing Sheets

(56) References Cited

U.S. PATENT DOCUMENTS

| | | | | |
|---|---|---|---|---|
| 8,257,002 | B2 * | 9/2012 | Prust | G05B 19/404 |
| | | | | 408/1 R |
| 8,933,366 | B2 * | 1/2015 | Patten | H05K 3/0029 |
| | | | | 219/121.66 |
| 2005/0274702 | A1 | 12/2005 | Deshi | |
| 2011/0066277 | A1 * | 3/2011 | Mann | B23Q 15/12 |
| | | | | 700/174 |
| 2017/0120345 | A1 * | 5/2017 | Patten | B23K 26/0823 |
| 2018/0015578 | A1 * | 1/2018 | Ravindra | B23B 1/00 |
| 2019/0224799 | A1 * | 7/2019 | Keller | B23Q 15/12 |
| 2020/0016707 | A1 * | 1/2020 | Ravindra | B23B 1/00 |

FOREIGN PATENT DOCUMENTS

| | | | | |
|---|---|---|---|---|
| CN | 111069767 | | 4/2020 | |
| CN | 111070433 A | * | 4/2020 | ............ B23K 26/04 |
| CN | 112139574 A | * | 12/2020 | ............ B23C 3/00 |
| CN | 212599634 | | 2/2021 | |
| CN | 113649686 A | * | 11/2021 | ............ B23K 26/04 |
| CN | 13829081 | | 12/2021 | |
| CN | 113829081 | | 12/2021 | |

OTHER PUBLICATIONS

"International Search Report (Form PCT/ISA/210) of PCT/CN2022/119848", mailed on Nov. 30, 2022, with English translation thereof, pp. 1-4.

* cited by examiner

SELECTIVE FIELD-ASSISTED MACHINING SYSTEM

CROSS-REFERENCE TO RELATED APPLICATIONS

This application is a continuation of international PCT application serial no. PCT/CN2022/119848, filed on Sep. 20, 2022, which claims the priority benefit of China application no. 202111205023.2, filed on Oct. 15, 2021. The entirety of each of the above-mentioned patent applications is hereby incorporated by reference herein and made a part of this specification.

BACKGROUND

Technical Field

The invention belongs to the technical field of ultra-precision processing, and in particular, relates to a selective field-assisted machining system.

Description of Related Art

Composite materials such as silicon-aluminum alloy and SiC particle reinforced Al metal matrix composites are composed of soft metal substrates and brittle particles (silicon, silicon carbide, etc.) and exhibit good physical, chemical, and mechanical properties such as low density, high specific stiffness, high fatigue resistance, high abrasion resistance, and high corrosion resistance, so these materials are widely used in aerospace, electronic packaging, and biotechnology. The integrity of the processed surfaces has an important impact on the performance of composite material parts. With the advancement and development of science and technology in China, higher requirements have been put forward for the processing precision and processing quality of composite base materials.

Diamond cutting technology has the advantages of high processing efficiency, high processing freedom, high processing precision, and low subsurface damage and thus has been proven to be an effective processing method for preparing high-quality processing surfaces for composite materials. However, the brittle particles may considerably reduce the deformation behavior of a ductile soft metal substrate, causing the brittle particles to be peeled off easily and resulting in low processing performance of a composite material. The extrusion deformation and strong friction of the soft metal substrate will lead to generation of great pressure and high cutting temperature between the chip and the rake face and produce large built-up edges, so that adhesive abrasion is generated on the cutting tool, the life of the cutting tool is affected, and the surface processing quality of the workpiece is lowered. In the ultra-precision diamond cutting processing with a single-step cutting depth of the micron scale, a multi-step cutting process is used to remove a material with a thickness of tens of microns in the related art. In the multi-step cutting and processing process of a composite material, the residual stress generated in the previous cutting process has a strong impact on the subsequent material removal. For instance, significant stress relaxation affects the particle-substrate interface strength, and thus the cutting tool-particle interaction is affected. This will make it difficult to improve the processing surface quality of the composite material and make the processing efficiency low. The efficient and high-quality manufacturing of composite materials has become a "bottleneck" problem in the field of aerospace manufacturing.

The in-situ laser assisted cutting technology can be used to couple the laser to the cutting tool, allows the laser beam to pass through the tool body and focus on the cutting region, softens hard and brittle materials, improves the plastic flow capacity of the brittle materials, inhibits crack expansion, and lowers cutting forces, so ultra-precision forming and manufacturing of hard and brittle material components featuring high efficiency and high quality may thus be implemented. However, for composite materials, the in-situ laser assisted machining technology will make the soft metal substrate softer, so that the brittle particles may be peeled off more easily during processing, and the adhesive abrasion generated on the cutting tool may become sever. Further, the diamond tool is more likely to generate heat and undergo thermochemical reactions, resulting in a reduced service life. Ultrasonic vibration-assisted cutting technology is an intermittent pulse field-assisted processing method that is able to implement nanoscale material removal and lower cutting force in each vibration cycle. Further, the cutting tool is in intermittent contact with the workpiece, making it easier for the cutting fluid or air to reach the processing region. In this way, the cooling and lubricating effects are optimized, the cutting heat is reduced, the thermochemical reaction of the cutting tool is reduced, the formation of built-up edges is inhibited, and ultra-precision processing of soft metal materials is implemented. However, when hard and brittle materials are processed, there is a risk of edge chipping of the cutting tool due to microscopic impact. Further, as limited by amplitude and frequency, the cutting speed and the processing efficiency are both low.

Therefore, how to implement high-efficiency, high-precision, low-damage ultra-precision cutting of particle reinforced metal matrix composites and how to effectively inhibit tool abrasion when the soft metal substrates of the composite materials are processed is a problem that needs to be urgently solved.

SUMMARY

In view of the defects found in the related art, the invention aims to provide a selective field-assisted machining system capable of completing ultra-precision cutting of brittle particles and a soft metal substrate at the same time in a single processing process, implementing high-precision and low-damage ultra-precision cutting of the brittle particles, and effectively inhibiting tool abrasion when the soft metal substrate is processed.

To achieve the above, the invention provides a selective field-assisted machining system including a micron-level high-speed identification module, an in-situ laser assisted module, an ultrasonic vibration module, an energy field loading high-speed control module, and a diamond tool.

The micron-level high-speed identification module is used to quickly identify a type of a material substrate of a workpiece to be processed, process identified information into a corresponding control signal, and send the control signal to the energy field loading high-speed control module including an electro-optic modulator and an ultrasonic power controller, so that selective processing of the workpiece to be processed is implemented.

When the type of the material substrate identified by the micron-level high-speed identification module is brittle particles, the electro-optic modulator controls the in-situ laser assisted module to generate a laser energy field according to the control signal. The laser energy field is focused on a cutting region between the diamond tool and the workpiece to be processed, assists the diamond tool in cutting process and enhances the ductile machinability of brittle particles. When the type of the material substrate identified by the micron-level high-speed identification module is a soft metal substrate, the ultrasonic power controller controls the ultrasonic vibration module to generate an ultrasonic field according to the control signal. The ultrasonic field allows the diamond tool to be in intermittent contact with the workpiece to be processed, so that ultra-precision processing of the soft metal substrate is implemented.

The selective field-assisted machining system provided by the invention organically integrates the diamond cutting technology, the in-situ laser assisted cutting technology, and the ultrasonic vibration machining technology by adding the micron-level high-speed identification module and the energy field loading high-speed control module. The energy field loading high-speed control module controls the laser field and the ultrasonic field to be selectively loaded on different substrates of the workpiece to be processed according to the type of the material substrate quickly identified by the micron-level high-speed identification module. That is, the use of the in-situ laser module to assist in processing the brittle particles can effectively improve a plastic flow capacity and a ductile-brittle transition depth of the brittle particles, inhibit crack expansion, and reduce subsurface damage. The use of the ultrasonic vibration assisted processing to process the soft metal substrate can optimize the cutting, cooling, and lubricating effects of the soft metal substrate, inhibit tool abrasion, and thus satisfy the demand for highly-efficient manufacturing of a composite material with ultra-high surface quality and surface shape accuracy.

In an embodiment, the in-situ laser assisted module includes a fiber laser and a laser high-frequency regulation device.

The electro-optic modulator is installed in a laser resonant cavity of the fiber laser. The electro-optic modulator is connected to the micron-level high-speed identification module. When the type of the material substrate identified by the micron-level high-speed identification module is brittle particles, the electro-optic modulator controls the fiber laser to emit laser according to the control signal sent by the micron-level high-speed identification module.

The laser high-frequency regulation device is arranged on a laser light ray emitted by the fiber laser and is used to perform high-frequency regulation on a speckle shape, a speckle size, and energy of the laser, so that the laser is projected onto the diamond tool and focused on the cutting region, and laser field-assisted cutting is implemented.

In an embodiment, a rear end of the diamond tool is configured as an ellipsoidal surface.

In an embodiment, the speckle shape includes a circular speckle, an elliptical speckle, or a square speckle. The speckle diameter is 20 to 1,000 μm. Distribution of the energy includes uniform distribution, Gaussian distribution, elliptical Gaussian distribution, super-Gaussian distribution, or flat-top Gaussian distribution.

In an embodiment, the ultrasonic vibration module is installed at a front end of the in-situ laser assisted module. The ultrasonic vibration module includes an ultrasonic horn, an ultrasonic power supply, and a piezoelectric ceramic unit, and the piezoelectric ceramic unit is installed on the ultrasonic horn.

A center of the ultrasonic horn is a through hole and is used to focus the laser field generated by the in-situ laser assisted module on the cutting region.

The ultrasonic power supply and the micron-level high-speed identification module are both connected to ultrasonic power controller. When the type of the material substrate identified by the micron-level high-speed identification module is a soft metal substrate, the ultrasonic power controller controls the ultrasonic power supply to generate a high-frequency vibration signal according to the control signal sent by the micron-level high-speed identification module.

The piezoelectric ceramic unit is connected to ultrasonic power supply, is used to receive the high-frequency vibration signal, and converts the high-frequency vibration signal into a mechanical vibration signal, so that the diamond tool installed at a front end of the ultrasonic horn generates two-dimensional ultrasonic vibration, and the intermittent contact between the diamond tool and the workpiece to be processed is implemented.

In an embodiment, the piezoelectric ceramic unit uses four groups of piezoelectric ceramic sheets, includes annular piezoelectric ceramics and semicircular piezoelectric ceramics, and is used to enable the ultrasonic horn to generate both axial vibration and bending vibration, so that the diamond tool generates ultrasonic elliptical vibration.

In an embodiment, the micron-level high-speed identification module includes an information rapid collection unit and a data processing unit.

The information rapid collection unit is installed at a front end of the diamond tool and is used to rapidly collect surface data information of the workpiece to be processed.

The data processing unit is connected to the information rapid collection unit, is used to collect and process the information collected by the information rapid collection unit, and processes the collected information into control signals for the electro-optical modulator and the ultrasonic power controller.

In an embodiment, the information rapid collection unit adopts a high-speed camera or a fiber sensor.

In an embodiment, the data processing unit adopts an industrial-grade IPC (industry PC), adopts binary image recognition processing for the high-speed camera, and adopts luminous flux threshold comparison processing for the fiber sensor.

DESCRIPTION OF THE EMBODIMENTS

In order to make the objectives, technical solutions, and advantages of the invention clearer and more comprehensible, the invention is further described in detail with reference to the drawings and embodiments. It should be understood that the specific embodiments described herein serve to explain the invention merely and are not used to limit the invention.

The invention provides a selective field-assisted machining system, which can be used for selective processing of a workpiece of any material and shape. The system is used for selective processing of a workpiece of a composite material as an example for detailed description in the invention.

Figure 1:
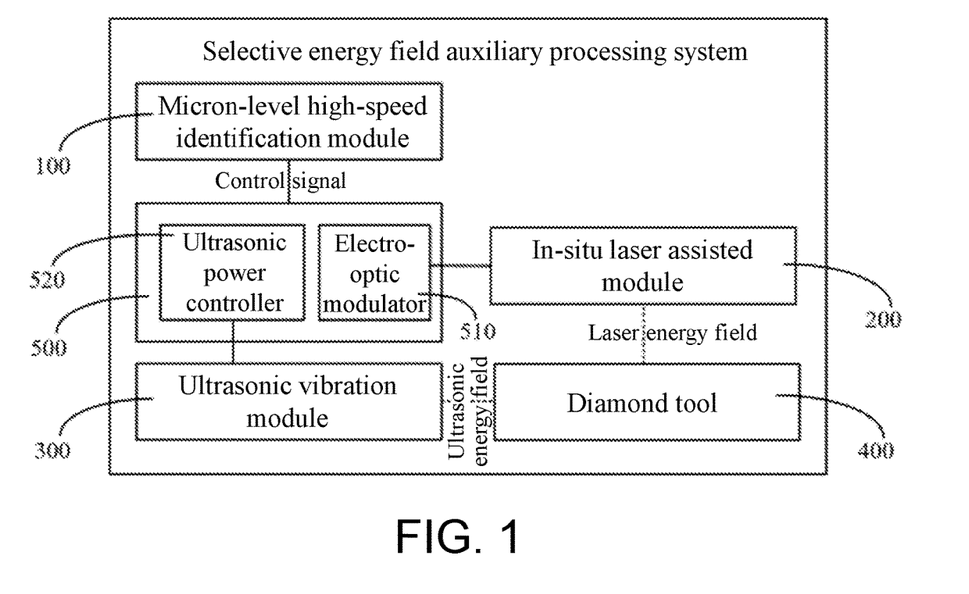
FIG. 1 is a schematic diagram of modules of a selective field-assisted machining system in an embodiment.

With reference to FIG. 1, FIG. 1 is a schematic diagram of modules of a selective field-assisted machining system provided by an embodiment of the invention. As shown in FIG. 1, the selective field-assisted machining system provided by this embodiment includes a micron-level high-speed identification module 100, an in-situ laser assisted module 200, an ultrasonic vibration module 300, an energy field loading high-speed control module 500, and a diamond tool 400.

Herein, the micron-level high-speed identification module 100 uses the micron-level high-speed identification technology and thus is able to quickly identify a type of a material substrate of a composite material to be processed, process identified information into a corresponding control signal, send the control signal to the energy field loading high-speed control module 500 including an electro-optic modulator 510 and an ultrasonic power controller 520, and use the energy field loading high-speed control module 500 to implement selective processing of the composite material by the in-situ laser assisted module 200 and the ultrasonic vibration module 300.

That is, when the type of the material substrate identified by the micron-level high-speed identification module 100 is brittle particles, such as silicon-based parts, the electro-optic modulator 510 controls the in-situ laser assisted module 200 to generate a laser field according to the control signal. Further, the laser field is focused on a cutting region between the diamond tool 400 and the composite material to be processed, that is, a cutting edge of the diamond tool 400. The laser field is used to heat, soften, and modify the material of the brittle particles, and then the diamond tool 400 is used to cut and process the brittle particles. In this way, a plastic flow capacity of the brittle material may be effectively improved, crack expansion may be inhibited, and a cutting force may be lowered, so that ultra-precision forming and manufacturing of a hard and brittle material component featuring high efficiency and high quality is implemented.

When the type of the material substrate identified by the micron-level high-speed identification module 100 is a soft metal substrate, such as an aluminum-based part, the ultrasonic power controller 520 controls the ultrasonic vibration module 300 to generate an ultrasonic field according to the sent control signal. The ultrasonic field acts on the diamond tool 400, causing the diamond tool 400 to be in intermittent contact with the composite material to be processed. This makes it easier for the cutting fluid or air to reach the cutting region during cutting, so that the cooling and lubricating effects are optimized, the cutting heat is reduced, the thermochemical reaction of the cutting tool is reduced, the formation of built-up edges is inhibited, and ultra-precision processing of the soft metal substrate is implemented.

The selective field-assisted machining system provided by this embodiment organically integrates the diamond cutting technology, the in-situ laser assisted machining technology, and the ultrasonic vibration machining technology by adding the micron-level high-speed identification module 100 and the energy field loading high-speed control module 500. The energy field loading high-speed control module 500 controls the laser field and the ultrasonic field to be selectively loaded on different substrates of the composite material to be processed according to the type of the material substrate quickly identified by the micron-level high-speed identification module 100. That is, the use of the in-situ laser assisted cutting to process the brittle particles may effectively improve the plastic flow capacity and a ductile-brittle transition depth of the brittle particles, inhibit crack expansion, and reduce subsurface damage. The use of the ultrasonic vibration assisted processing to process the soft metal substrate may optimize the cutting, cooling, and lubricating effects of the soft metal substrate, inhibit tool abrasion, and thus satisfy the demand for highly-efficient manufacturing of a composite material with ultra-high surface quality and surface shape accuracy.

Figure 2:
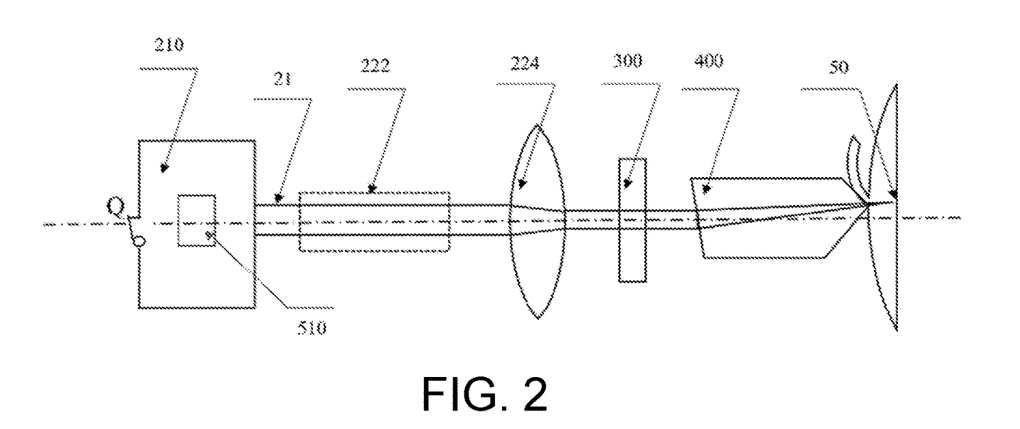
FIG. 2 is a schematic diagram of a technical principle of the selective field-assisted machining system in an embodiment.
Figure 3:
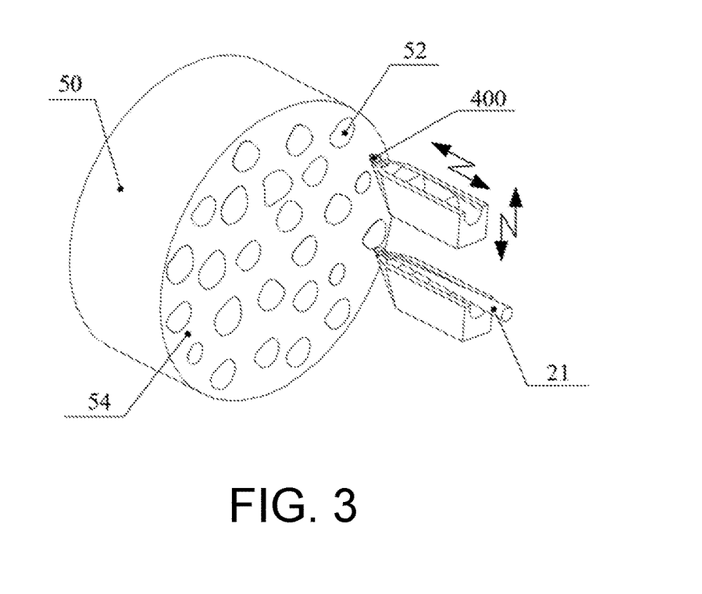
FIG. 3 is a schematic diagram of an auxiliary processing process of the selective field-assisted machining system in an embodiment.

In an embodiment, with reference to FIG. 2 and FIG. 3, the in-situ laser assisted module 200 may include a fiber laser 210 and a laser high-frequency regulation device 220 (not shown in FIG. 2).

Herein, the electro-optic modulator 510 is installed in a laser resonant cavity of the fiber laser 210. The electro-optic modulator 510 is connected to the micron-level high-speed identification module 100. When the type of the material substrate identified by the micron-level high-speed identification module 100 is brittle particles 52, the electro-optic modulator 510 controls the fiber laser 210 to emit laser 21 according to the control signal sent by the micron-level high-speed identification module 100. That is, the electro-optical modulator 510 allows generation of laser pulses by not blocking a resonant channel of the fiber laser 210. To be specific, the laser power of the fiber laser 210 may be set to be adjustable in the range of 0 to 100 W.

The laser high-frequency regulation device 220 is arranged on the laser light ray 21 emitted by the fiber laser 210 and is used to perform high-frequency regulation on a speckle shape, a speckle size, and energy of the laser 21, so that the laser 21 is projected onto the diamond tool 400 and focused on a cutting edge of the diamond tool 400, and laser field-assisted cutting and processing is implemented In order to ensure that the laser may achieve precise focusing, a rear end of the diamond tool 400 provided in this embodiment may be configured as an ellipsoidal surface. This ellipsoidal surface may ensure that the laser 21 projected onto any place on the ellipsoidal surface may be focused to the cutting edge of the cutting tool through refraction and ensure that the laser can implement precise focusing and implement precise heating and softening of the cutting region.

Figure 4:
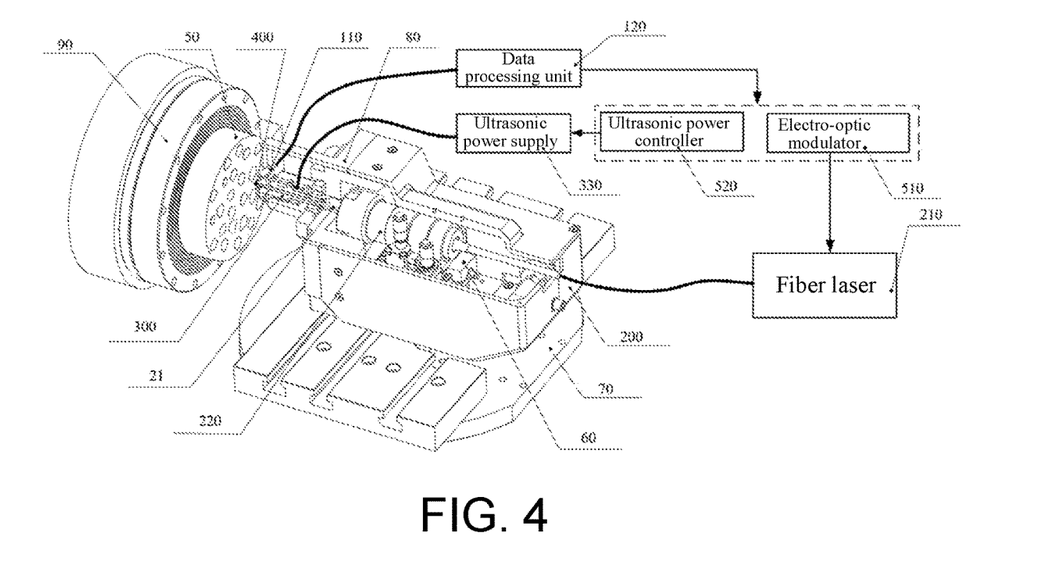
FIG. 4 is a schematic view of a structure of the selective field-assisted machining system in an embodiment.

To be specific, the laser high-frequency regulation device 220 may include a laser regulator 222 and a focusing lens 224. With reference to FIG. 4, the laser high-frequency regulation device 220 may be installed on a precision micro-displacement movement platform 60 with a minimum movement amount of 1 μm. By adjusting a distance, a direction, etc. between a laser emission position and the focusing lens 224, various adjustments such as adjustments of laser energy distribution, a speckle diameter, and the speckle shape may be implemented. The laser emission position has is related to the diamond tool 400 to a certain extent. Since the rake angles generated by the cutting tool are different, after the laser is focused, the positions of the laser irradiation on the surface of the workpiece is different. By adjusting a height of the focusing lens 224, a speckle position may be adjusted up and down. The distance between the laser beam and a speckle focus of the focusing lens 224 determines the degree of focusing of the beam and affects the speckle size, the speckle shape, and so on. Therefore, by adjusting the distance of the focusing lens 224, different speckle sizes and shapes may be adjusted. When the position of the laser beam is at a focal point of the focusing lens 224, the speckle is best focused, and the minimum speckle diameter is 20 μm at this point. When the distance is adjusted to the maximum value of a stroke, the beam focus is small, and the speckle diameter is the largest at this point, up to 1,000 μm. The adjustment of different energy distributions may mainly change the position of the highest energy of the laser beam, which is mainly implemented by changing the relative position of the focusing lens 224 and the incident laser beam. The center position of the beam waist Gaussian laser has the highest energy, where the laser beam and the focal point of the focusing lens 224 are kept at the same level.

Herein, the distribution of the energy includes uniform distribution, Gaussian distribution, elliptical Gaussian distribution, super-Gaussian distribution, or flat-top Gaussian distribution and the like. The speckle diameter may be adjusted arbitrarily within the range of 20 to 1,000 μm. The shape of the speckle includes a circular speckle, an elliptical speckle, or a square speckle and the like.

Figure 5:
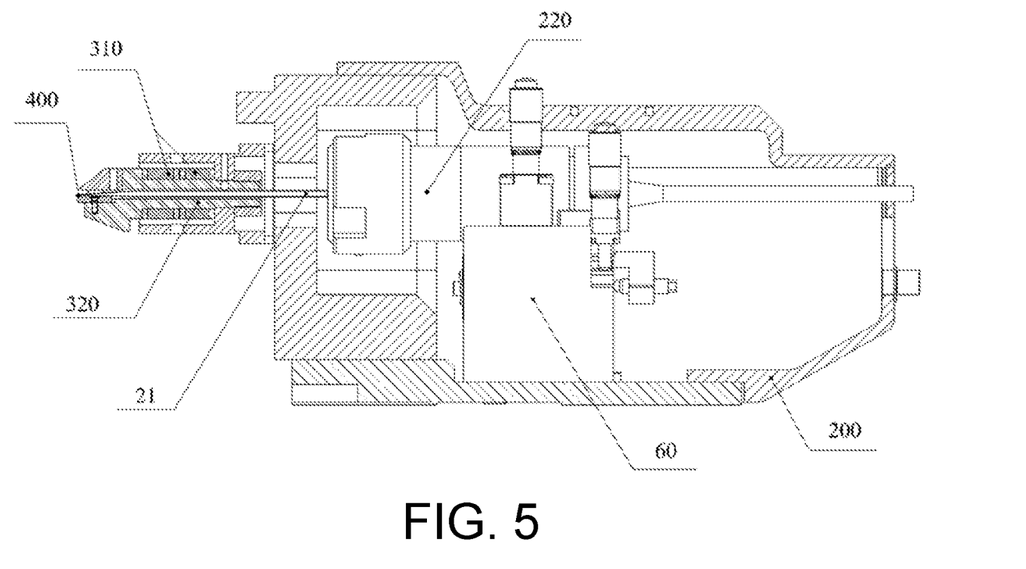
FIG. 5 is a schematic cross-sectional view of the structure of the selective field-assisted machining system in an embodiment.

In an embodiment, with reference to FIG. 3 to FIG. 5, the ultrasonic vibration module 300 is installed at a front end of the in-situ laser assisted module 200. The ultrasonic vibration module 300 includes a piezoelectric ceramic unit 310, an ultrasonic horn 320, and an ultrasonic power supply 330, and the piezoelectric ceramic unit 310 is installed on the ultrasonic horn 320.

Herein, a center of the ultrasonic horn 320 is a through hole and is used to focus the laser emitted by the fiber laser 210 on the cutting edge of the diamond tool 400.

The ultrasonic power supply 330 and the micron-level high-speed identification module 100 are both connected to ultrasonic power controller 520. When the type of the material substrate identified by the micron-level high-speed identification module 100 is a soft metal substrate 54, the ultrasonic power controller 520 controls the ultrasonic power supply 330 to generate a high-frequency vibration signal according to the control signal sent by the micron-level high-speed identification module 100.

The piezoelectric ceramic unit 310 is connected to ultrasonic power supply 330, is used to receive the high-frequency vibration signal, and converts the high-frequency vibration signal into a mechanical vibration signal, so that the diamond tool 400 installed at a front end of the ultrasonic horn 320 generates two-dimensional ultrasonic vibration, and the intermittent contact between the diamond tool 400 and a composite material to be processed 50 is therefore implemented.

To be specific, the piezoelectric ceramic unit 310 may use four groups of piezoelectric ceramic sheets and may include annular piezoelectric ceramics and semicircular piezoelectric ceramics, so that the ultrasonic horn 320 may generate axial vibration and bending vibration at the same time, and the diamond tool 400 installed at the front end of the ultrasonic horn 320 thus generates ultrasonic elliptical vibration. The ultrasonic elliptical vibration may bring out the swarf in time after material removal in each vibration cycle. In this way, material stacking on the rake face of the cutting tool is prevented from occurring, and the swarf is prevented from affecting the optical path of the in-situ laser. Preferably, the piezoelectric ceramic unit 310 enables the vibration frequency of the ultrasonic elliptical vibration generated by the diamond tool 400 to reach above 40 kHz, and both the axial amplitude and the transverse amplitude reach above 4 μm.

In an embodiment, the micron-level high-speed identification module 100 includes an information rapid collection unit 110 and a data processing unit 120, and the rapid collection unit 110 is connected to the data processing unit 120. Herein the rapid collection unit 110 is used to rapidly collect surface data information of the workpiece to be processed. The data processing unit 120 is used to collect and process the information collected by the information rapid collection unit 110 and processes the collected information into control signals for the electro-optical modulator 510 and the ultrasonic power controller 520.

To be specific, the information rapid collection unit 110 may be installed at the front end of the diamond tool 400 and thus may be used to effectively reduce the delay caused by identification, so that the energy field may be accurately and selectively loaded.

Considering that the size of brittle particles is 20 to 150 μm and the cutting speed is 0.5 to 5 m/min, the information rapid collection unit 110 may use a high-speed camera or a fiber sensor to collect the surface data of the composite material in real time. the data processing unit may use an industrial-grade IPC (industry PC) as the data processing controller, adopts binary image recognition processing for the high-speed camera, and adopts luminous flux threshold comparison processing for the fiber sensor. Surface data collection of the composite material to be processed 50 under high-speed rotation may thus be implemented, a micron-level collection region is presented, and features such as high stability, small delay, high collection frequency are provided. The adopted data processing unit 120 may process the collected data in real time and can quickly issue a control instruction to take different processing measures for different materials.

The working principle of the selective field-assisted machining system provided by the above embodiments is described as follows. When the type of the material substrate identified by the micron-level high-speed identification module 100 is brittle particles 52, the micron-level high-speed identification module 100 processes the identified information into a control signal and sends it to the electro-optic modulator 510 and the ultrasonic power controller 520. The ultrasonic power controller 520 controls the ultrasonic power supply 330 not to generate a high-frequency vibration signal based on the control signal. The electro-optic modulator 510 allows the generation of laser pulses by not blocking the resonant channel of the fiber laser 210 according to the control signal, so that the laser 21 is focused on the cutting edge of the cutting tool, the cutting region is precisely heated and softened, and the ultra-precision processing of the brittle particles is thereby implemented.

Figure 6:
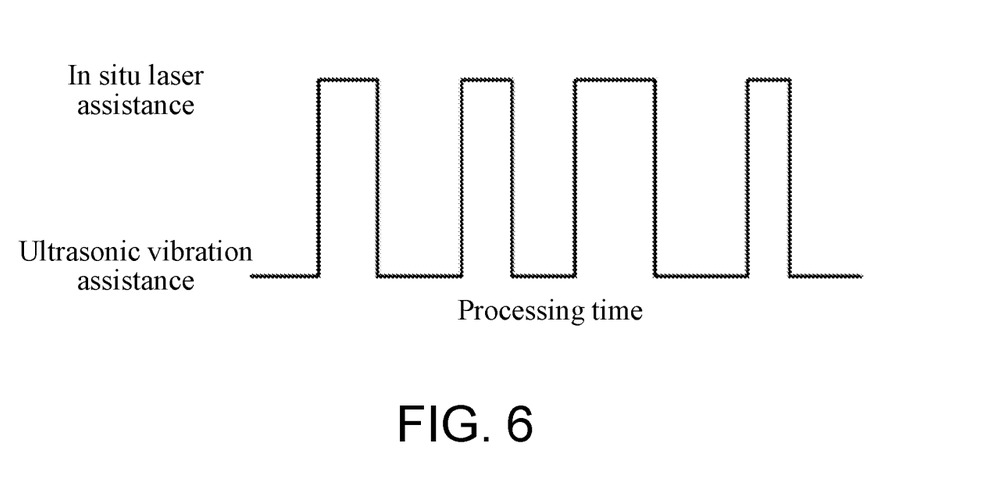
FIG. 6 is a schematic diagram of energy field switching of the selective field-assisted machining system in an embodiment.

When the type of the material substrate identified by the micron-level high-speed identification module 100 is the soft metal substrate 54, the micron-level high-speed identification module 100 processes the identified information into another control signal and sends it to the electro-optic modulator 510 and the ultrasonic power controller 520. The ultrasonic power controller 520 controls the ultrasonic power supply 330 to supply power and generate a high-frequency vibration signal based on the control signal, so that the cutting tool and the workpiece are in intermittent contact. The electro-optic modulator 510 cuts off the resonance channel of the fiber laser 210 according to the control signal to inhibit the generation of laser pulses, so that the laser cannot be loaded into the cutting region, and the ultra-precision processing of the soft metal substrate is thereby implemented. With reference to FIG. 6, FIG. 6 is a schematic diagram of energy field switching of the selective field-assisted machining system provided by this embodiment.

The selective field-assisted machining system provided by the invention may be built on ultra-precision processing. As shown in FIG. 4 and FIG. 5, the ultra-precision processing includes a clamping device, a processing device, and the aforementioned selective field-assisted machining system. The composite material to be processed 50 is adsorbed on a spindle 90 of the clamping device through vacuum adsorption. The ultrasonic vibration module 300 is fixed at the front end of the in-situ laser assisted module 200. The in-situ laser assisted module 200 is fixed on a cutting tool holder 70 of the processing device. The information rapid collection unit 110 in the micron-level high-speed identification module 100 is fixed on a bracket 80 provided at the front end of the diamond tool 400, so that the collection region is placed in front of the cutting region. In the selective field-assisted machining system provided by the invention, the type of material substrate during processing is identified in real time through micron-level high-speed identification technology, the identified information is processed into a control signal, and the control signal is sent to the electro-optic modulator 510 and the ultrasonic power controller 520, so that selective processing of the composite material to be processed 50 is implemented. That is, in-situ laser assisted cutting is used to process the brittle particles 5 and ultrasonic vibration processing is used to process the soft metal substrate 54, so that the demand for highly-efficient manufacturing of the composite material to be processed 50 with ultra-high surface quality and surface shape accuracy is satisfied.

In the selective field-assisted machining system provided by this embodiment, the structure is simple and the degree of integration is high, so that the ultra-precision processing of the brittle particles as well as the soft metal substrate may be completed at the same time in a single processing process. The cutting depth may thus be increased and the production efficiency is improved while the manufacturing accuracy is satisfied.

Figure 7:
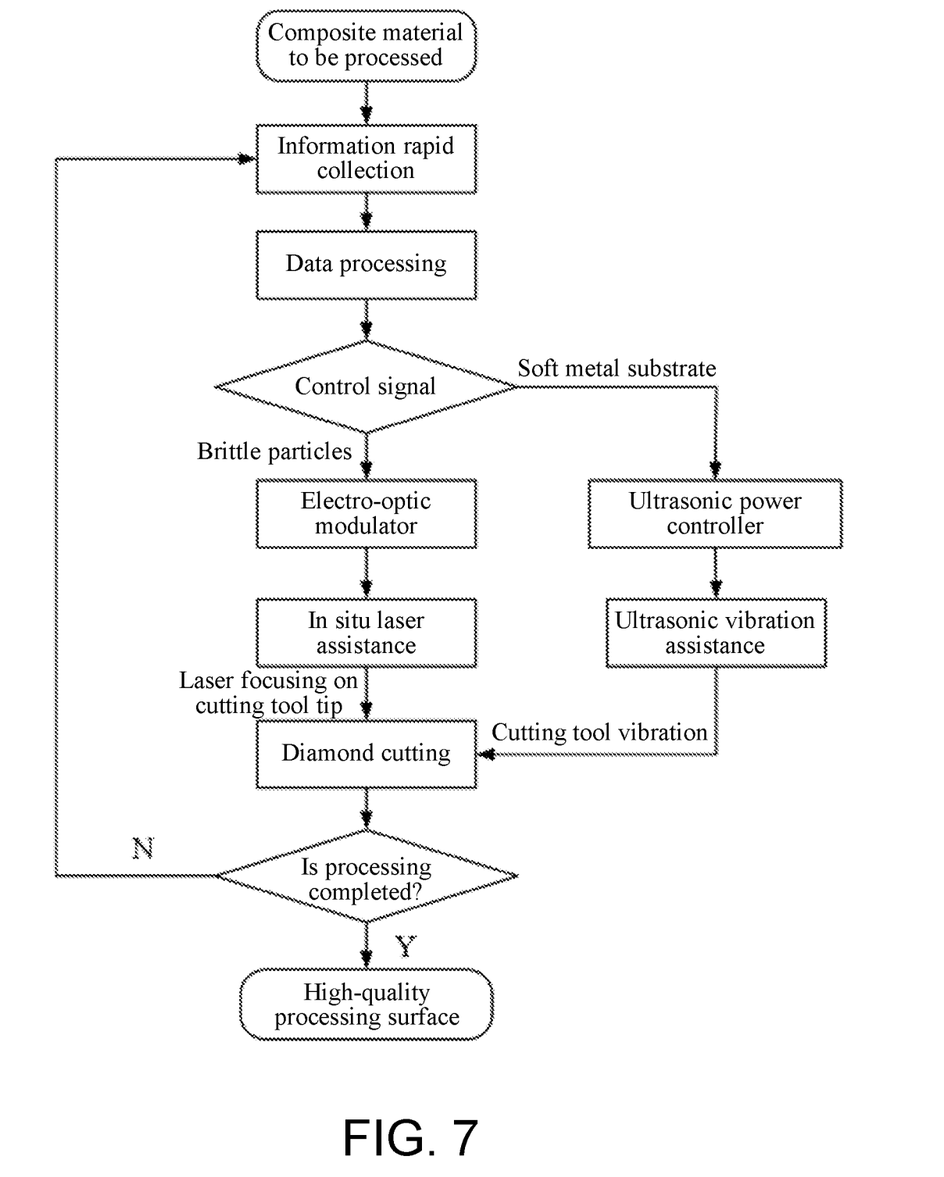
FIG. 7 is a control flow chart of the selective field-assisted machining system in an embodiment.

With reference to FIG. 7, implementation of selective processing by using the selective field-assisted machining system provided by this embodiment specifically includes the following steps.

The information rapid collection unit 110 is used first to quickly collect the surface data information of the composite material to be processed and send the information to the data processing unit 120.

The data processing unit 120 is then used to process the information into a control signal and send the control signal to the electro-optic modulator 510 and the ultrasonic power controller 520.

When a cutting tool tip region is identified as the soft metal substrate 54, the ultrasonic power controller 520 controls the ultrasonic power supply 330 to generate a high-frequency vibration signal. The piezoelectric ceramic unit 310 installed on the ultrasonic horn 320 converts the electrical signal into a mechanical vibration signal, so that the diamond tool 400 installed at the front end of the ultrasonic horn 320 generates two-dimensional ultrasonic vibration and the cutting tool is in intermittent contact with the workpiece, and the ultra-precision processing of the soft metal substrate 54 is therefore implemented. When the cutting tool tip region is identified as the brittle particles 52, the electro-optical modulator 510 allows the generation of laser pulses by not blocking the resonant channel of the fiber laser 210. The laser high-frequency regulation device 220 focuses the laser 21 on the cutting edge of the cutting tool by adjusting the distance, direction, etc. between the laser emission position and the focusing lens, so that the cutting region is precisely heated and softened, and the ultra-precision processing of the brittle particles 52 is implemented.

In the selective field-assisted machining system provided by this embodiment, the advantages of laser field and the ultrasonic field are fully utilized and selectively loaded on different substrates of the composite material. The plastic flow capacity and the ductile-brittle transition depth of the brittle particles 52 are improved, crack expansion is inhibited, and subsurface damage is reduced through the use of the in-situ laser field. The cutting cooling and lubricating effects of the soft metal substrate 54 are optimized and tool abrasion is inhibited through the use of the ultrasonic vibration field, so that the demand for highly-efficient manufacturing of a composite material with ultra-high surface quality and surface shape accuracy is satisfied. The invention is not only applicable to composite material workpieces, but also to the selective processing of workpieces of other materials and other shapes.

A person having ordinary skill in the art should be able to easily understand that the above description is only preferred embodiments of the invention and is not intended to limit the invention. Any modifications, equivalent replacements, and modifications made without departing from the spirit and principles of the invention should fall within the protection scope of the invention.

What is claimed is:

1. A selective field-assisted machining system comprising: a micron-level high-speed identification module, an in-situ laser assisted module, an ultrasonic vibration module, an energy field loading high-speed control module, and a diamond tool, wherein the micron-level high-speed identification module is used to identify a type of a material of a region of a workpiece to be processed and to be cut by the diamond tool, to process identified information into a corresponding control signal, and to send the control signal to the energy field loading high-speed control module comprising an electro-optic modulator and an ultrasonic power controller, so that selective processing of the workpiece to be processed is implemented, the electro-optic modulator controls the in-situ laser assisted module to generate a laser field according to the control signal when the type of the material of the region of the workpiece to be processed and to be cut by the diamond tool identified by the micron-level high-speed identification module is particles comprising silicon or silicon carbide, wherein the laser field is focused on a cutting region between the diamond tool and the workpiece to be processed, assists the diamond tool in a cutting process and enhances a machinability of the particles; and the ultrasonic power controller controls the ultrasonic vibration module to generate an ultrasonic field according to the control signal when the type of the material of the region of the workpiece to be processed and to be cut by the diamond tool identified by the micron-level high-speed identification module is an aluminum-based metal substrate, and the ultrasonic field allows the diamond tool to be in intermittent contact with the workpiece to be processed, so that processing of the aluminum-based metal substrate is implemented, wherein the ultrasonic vibration module is installed at an end of the in-situ laser assisted module and is between the in-situ laser assisted module and the workpiece to be processed, the ultrasonic vibration module comprises an ultrasonic horn, an ultrasonic power supply, and a piezoelectric ceramic unit, and the piezoelectric ceramic unit is installed on the ultrasonic horn, wherein a center of the ultrasonic horn is a through hole and is used to focus the laser field generated by the in-situ laser assisted module on the cutting region, the ultrasonic power supply and the micron-level high-speed identification module are both connected to the ultrasonic power controller, and the ultrasonic power controller controls the ultrasonic power supply to generate a vibration signal according to the control signal sent by the micron-level high-speed identification module when the type of the material of the region of the workpiece to be processed and to be cut by the diamond tool identified by the micron-level high-speed identification module is the aluminum-based metal substrate, and the piezoelectric ceramic unit is connected to the ultrasonic power supply, is used to receive the vibration signal, and converts the vibration signal into a mechanical vibration signal, so that the diamond tool installed at an end of the ultrasonic horn generates two-dimensional ultrasonic vibration, and the intermittent contact between the diamond tool and the workpiece to be processed is implemented.

2. The selective field-assisted machining system according to claim 1, wherein the in-situ laser assisted module comprises a fiber laser and a laser frequency regulation device, wherein the electro-optic modulator is installed in a laser resonant cavity of the fiber laser, the electro-optic modulator is connected to the micron-level high-speed identification module, the electro-optic modulator controls the fiber laser to emit a laser according to the control signal sent by the micron-level high-speed identification module when the type of the material of the region of the workpiece to be processed and to be cut by the diamond tool identified by the micron-level high-speed identification module is the particles comprising silicon or silicon carbide, the laser frequency regulation device is arranged on the laser emitted by the fiber laser and is used to perform frequency regulation on a speckle shape, a speckle size, and energy of the laser, so that the laser is projected onto the diamond tool and is focused on the cutting region, and laser assisted cutting is implemented.

3. The selective field-assisted machining system according to claim 2, wherein the speckle shape comprises a circular speckle, an elliptical speckle, or a square speckle, the speckle diameter is 20 to 1,000 μm, and distribution of the energy of the laser comprises uniform distribution, Gaussian distribution, elliptical Gaussian distribution, super-Gaussian distribution, or flat-top Gaussian distribution.

4. The selective field-assisted machining system according to claim 2, wherein an end of the diamond tool between the in-situ laser assisted module and the workpiece to be processed is configured as an ellipsoidal surface.

5. The selective field-assisted machining system according to claim 1, wherein a rear end of the diamond tool is configured as an ellipsoidal surface.

6. The selective field-assisted machining system according to claim 1, wherein the piezoelectric ceramic unit uses four groups of piezoelectric ceramic sheets, comprises annular piezoelectric ceramics and semicircular piezoelectric ceramics, and is used to enable the ultrasonic horn to generate both axial vibration and bending vibration, so that the diamond tool generates ultrasonic elliptical vibration.

7. The selective field-assisted machining system according to claim 1, wherein the micron-level high-speed identification module comprises an information rapid collection unit and a data processing unit, wherein the information rapid collection unit is installed at an end of the diamond tool away from the workpiece to be processed and is used to collect surface data information of the workpiece to be processed, the data processing unit is connected to the information rapid collection unit, is used to collect and process the information collected by the information rapid collection unit, and processes the collected information into control signals for the electro-optical modulator and the ultrasonic power controller.

8. The selective field-assisted machining system according to claim 7, wherein the information rapid collection unit comprises a camera or a fiber sensor.

9. The selective field-assisted machining system according to claim 8, wherein the data processing unit comprises an industrial-grade PC, configured to perform binary image recognition processing when the information rapid collection unit is the camera, and is configured to perform luminous flux threshold comparison processing when the information rapid collection unit is the fiber sensor.

* * * * *